United States Patent
Jung et al.

(10) Patent No.: US 10,972,666 B2
(45) Date of Patent: *Apr. 6, 2021

(54) LENS MOVING UNIT COMPRISING A SENSING MAGNET AND A CORRECTION MAGNET

(71) Applicant: LG INNOTEK CO., LTD., Seoul (KR)

(72) Inventors: Tae Jin Jung, Seoul (KR); Sang Jun Min, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,815

(22) Filed: Aug. 15, 2019

(65) Prior Publication Data

US 2019/0373175 A1 Dec. 5, 2019

Related U.S. Application Data

(63) Continuation of application No. 15/959,951, filed on Apr. 23, 2018, now Pat. No. 10,425,585, which is a (Continued)

(30) Foreign Application Priority Data

Mar. 17, 2014 (KR) .......................... 10-2014-0030866

(51) Int. Cl.
*H04N 5/232* (2006.01)
*G03B 13/36* (2021.01)
(Continued)

(52) U.S. Cl.
CPC .......... *H04N 5/23287* (2013.01); *G02B 7/08* (2013.01); *G02B 27/646* (2013.01); *G03B 13/36* (2013.01);
(Continued)

(58) Field of Classification Search
CPC ........... H04N 5/23287; H04N 5/23212; H04N 5/23258; G02B 7/08; G02B 27/646; G03B 13/36
See application file for complete search history.

(56) References Cited

U.S. PATENT DOCUMENTS 7,881,598 B1 2/2011 Wu et al.
2007/0097532 A1 5/2007 Kuo et al.
(Continued)

FOREIGN PATENT DOCUMENTS

CN 101093272 A 12/2007
CN 101986192 A 3/2011
(Continued)

OTHER PUBLICATIONS

European Search Report dated Oct. 12, 2015, in European Application No. 15159225.0.
(Continued)

*Primary Examiner* — Padma Haliyur
(74) *Attorney, Agent, or Firm* — Saliwanchik, Lloyd & Eisenschenk

(57) ABSTRACT

One embodiment of a lens moving unit includes a bobbin mounted with at least one sheet of lens and arranged at a periphery with a coil unit, a cover member mounted with a magnet at a position corresponding to that of the coil unit, upper and bottom elastic members respectively coupled at one distal end to upper and bottom surfaces of the bobbin to support movement of the bobbin to an optical axis direction, and a detection unit to detect a movement parallel to an optical axis of the bobbin, wherein the detection unit includes a sensing magnet mounted at a periphery of the bobbin, and a position detection sensor arranged at a lateral wall of the cover member and formed at an inner lateral surface opposite to the sensing magnet, wherein the bobbin
(Continued)

includes a correction magnet mounted at a side opposite to that of the sensing magnet.

25 Claims, 12 Drawing Sheets

Related U.S. Application Data continuation of application No. 15/373,032, filed on Dec. 8, 2016, now Pat. No. 9,979,888, which is a continuation of application No. 14/643,414, filed on Mar. 10, 2015, now Pat. No. 9,547,216.

(51) Int. Cl.
 *G02B 7/08* (2021.01)
 *G02B 27/64* (2006.01)
 *H04N 5/225* (2006.01)

(52) U.S. Cl.
 CPC ....... *H04N 5/2254* (2013.01); *H04N 5/23212* (2013.01); *H04N 5/23258* (2013.01)

(56) References Cited

U.S. PATENT DOCUMENTS

| | | |
|---|---|---|
| 2009/0252488 A1 | 10/2009 | Eromaki et al. |
| 2010/0202766 A1 | 8/2010 | Takizawa et al. |
| 2012/0229901 A1 | 9/2012 | Moriya et al. |
| 2013/0136438 A1 | 5/2013 | Lee et al. |
| 2013/0182325 A1 | 7/2013 | Minamisawa et al. |

FOREIGN PATENT DOCUMENTS

| | | |
|---|---|---|
| CN | 102870042 A | 1/2013 |
| CN | 102879973 A | 1/2013 |
| CN | 102934020 A | 2/2013 |
| CN | 102955324 A | 3/2013 |
| CN | 103309120 A | 9/2013 |
| EP | 3115819 A1 | 1/2017 |
| JP | 2007-155801 A | 6/2007 |
| JP | 2012-177753 A | 9/2012 |
| JP | 5140572 B2 | 2/2013 |
| KR | 10-2007-0047992 A | 5/2007 |
| KR | 10-2008-0011639 A | 2/2008 |
| KR | 10-2014-0030767 A | 3/2014 |
| WO | WO-2009-133690 A1 | 11/2009 |

OTHER PUBLICATIONS

Office Action dated Jan. 4, 2017 in European Application No. 15159225.0.
Office Action dated May 17, 2016 in U.S. Appl. No. 14/643,414.
Office Action dated Apr. 18, 2018 in European Application No. 15159225.0-1020.
Notice of Allowance dated Sep. 8, 2016 in U.S. Appl. No. 14/643,414.
Office Action dated Aug. 9, 2017 in U.S. Appl. No. 15/373,032.
Notice of Allowance dated Jan. 22, 2018 in U.S. Appl. No. 15/373,032.
Office Action dated Oct. 4, 2018 in U.S. Appl. No. 15/959,951.
Notice of Allowance dated May 15, 2019 in U.S. Appl. No. 15/959,951.
Office Action dated Jun. 1, 2020 in Korean Application No. 10-2014-0030866.
Office Action dated Sep. 9, 2020 in Chinese Application No. 201910796212.8.
Office Action dated Nov. 4, 2020 in Chinese Application No. 201910797036.X.

LENS MOVING UNIT COMPRISING A SENSING MAGNET AND A CORRECTION MAGNET

CROSS-REFERENCE TO RELATED APPLICATIONS

This application is a continuation of U.S. application Ser. No. 15/959,951, filed Apr. 23, 2018; which is a continuation of U.S. application Ser. No. 15/373,032, filed Dec. 8, 2016, now U.S. Pat. No. 9,979,888, issued May 22, 2018; which is a continuation of U.S. application Ser. No. 14/643,414, filed Mar. 10, 2015, now U.S. Pat. No. 9,547,216, issued Jan. 17, 2017; which claims the benefit under 35 U.S.C. § 119 of Korean Application No. 10-2014-0030866, filed Mar. 17, 2014, all of which are hereby incorporated by reference in their entirety.

BACKGROUND OF THE DISCLOSURE

Field of the Invention

The teachings in accordance with the exemplary embodiments of this present disclosure generally relate to a lens moving unit and a camera module having the same.

Background of the Related Art

In general, a camera module may include an optical system formed with an image sensor, a PCB (Printed Circuit Board) mounted with the image sensor configured to transmit an electric signal, an IR (Infrared) cut-off filter configured to cut off light of infrared region from the image sensor and at least one sheet of lens configured to transmit an image to the image sensor. At this time, the optical system may be installed with a lens moving unit configured to perform an auto focusing function and a hand shake correction function.

The lens moving unit may be variably formed and widely uses a voice coil unit motor. The voice coil unit motor is operated by an electric interaction between a magnet fixed to a housing and a coil unit wound on a periphery of a bobbin coupled to a lens barrel to perform an auto focusing function. An actuator module of voice coil motor method thus described is operated in a manner such that a vertically-moving bobbin is elastically supported by upper and bottom elastic members to reciprocally move to a direction parallel to an optical axis.

Although development of a lens moving unit is recently demanded to quickly grasp an optimal focusing position by receiving position information of a bobbin mounted with a lens in order to shorten an auto focusing time of a camera module, the lens moving unit may suffer, in terms of performance, from disadvantages of instability in electro-magnetic force and eccentricity of a lens barrel due to magnetic force.

BRIEF SUMMARY

The present disclosure has been made to solve the foregoing disadvantages/problems of the prior art and therefore an object of certain embodiments of the present disclosure is to provide a lens moving unit configured to receive position information of a bobbin and a camera module having the lens moving unit.

The present disclosure is to solve at least one or more of the above problems and/or disadvantages in whole or in part and to provide at least advantages described hereinafter. In order to achieve at least the above objects, in whole or in part, and in accordance with the purposes of the present disclosure, as embodied and broadly described, and in one general aspect of the present invention, there is provided a lens moving unit, the lens moving unit comprising:

a bobbin mounted with at least one sheet of lens and arranged at a periphery with a coil unit; a cover member mounted with a magnet at a position corresponding to that of the coil unit; upper and bottom elastic members respectively coupled at one distal end to an upper surface and a bottom surface of the bobbin to support movement of the bobbin to a lens optical axis direction; and a detection unit configured to detect a movement parallel to an optical axis of the bobbin, wherein the detection unit includes a sensing magnet mounted at a periphery of the bobbin, and a position detection sensor arranged at a lateral wall of the cover member and formed at an inner lateral surface opposite to the sensing magnet, and wherein the bobbin further include a correction magnet mounted at a side opposite to that of the sensing magnet.

Preferably, but not necessarily, the cover member may be formed with a ferromagnetic sub stance.

Preferably, but not necessarily, the bobbin may be arranged in a manner such that the sensing magnet is arranged at a position not interfering with the first mover formed with a coil unit.

Preferably, but not necessarily, the sensing magnet may be arranged at a lower side than the coil unit.

Preferably, but not necessarily, an imaginary line connecting a center of the sensing magnet and a center of the correction magnet may pass a center of the bobbin.

Preferably, but not necessarily, the sensing magnet and the correction magnet may be so arranged as not to face the second mover formed with a magnet.

Preferably, but not necessarily, the position detection sensor may be a Hall sensor, and a circuit substrate may be mounted with a plurality of terminals for external exposure.

In another general aspect of the present disclosure, there is provided with a camera module, the camera module comprising:

an image sensor;

a PCB (Printed Circuit Board) mounted with the image sensor; and a lens moving unit coupled to the PCB to transmit an image to the image sensor, wherein the lens moving unit includes a cover member formed with an inner space at an inner side, a housing disposed at the inner space, a bobbin disposed at an inner side of the housing, a support member coupled to the bobbin and the housing to flexibly support the bobbin relative to the housing, a sensing magnet disposed at the bobbin, a position detection sensor configured to detect a position of the sensing magnet, and a correction magnet disposed at the bobbin to offset an attractive force between the sensing magnet and the cover member.

The lens moving unit and the camera module having the same according to the exemplary embodiments of the present disclosure has an advantageous effect in that position of a bobbin during an auto focusing operation can be accurately grasped by mounting a sensing magnet at an external surface of the bobbin and detecting a position of the sensing magnet using a position detection sensor such as a Hall sensor.

Another advantageous effect is that an attractive force formed between a sensing magnet attached to a bobbin and a metal-materialed cover member can be offset by an attractive force formed between a correction magnet mounted at a side opposite to the sensing magnet and the cover member to thereby inhibit the bobbin from leaning toward the cover member.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, these exemplary embodiments are provided so that this description will be thorough and complete, and will fully convey the scope of the present inventive concept to those skilled in the art.

Hereinafter, a lens moving unit and a camera module having the same according to exemplary embodiments of the present disclosure will be described in detail with reference to the accompanying drawings.

Figure 1:
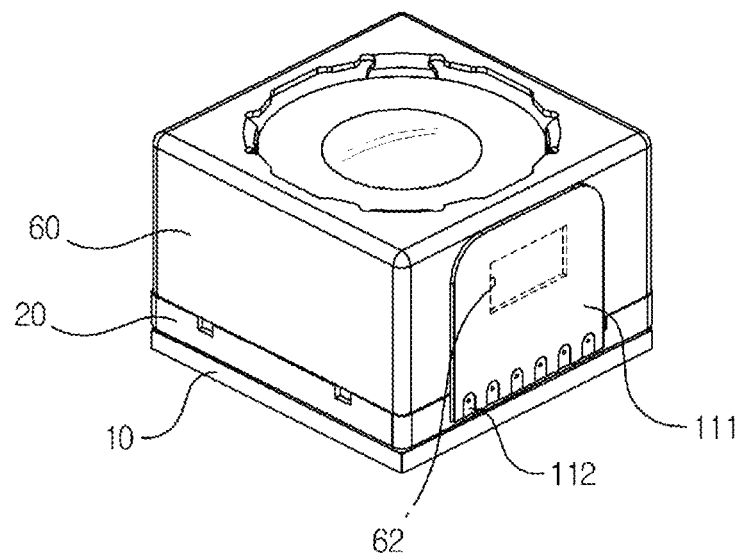
FIG. 1 is a schematic perspective view illustrating a camera module according to an exemplary embodiment of the present disclosure.
Figure 2:
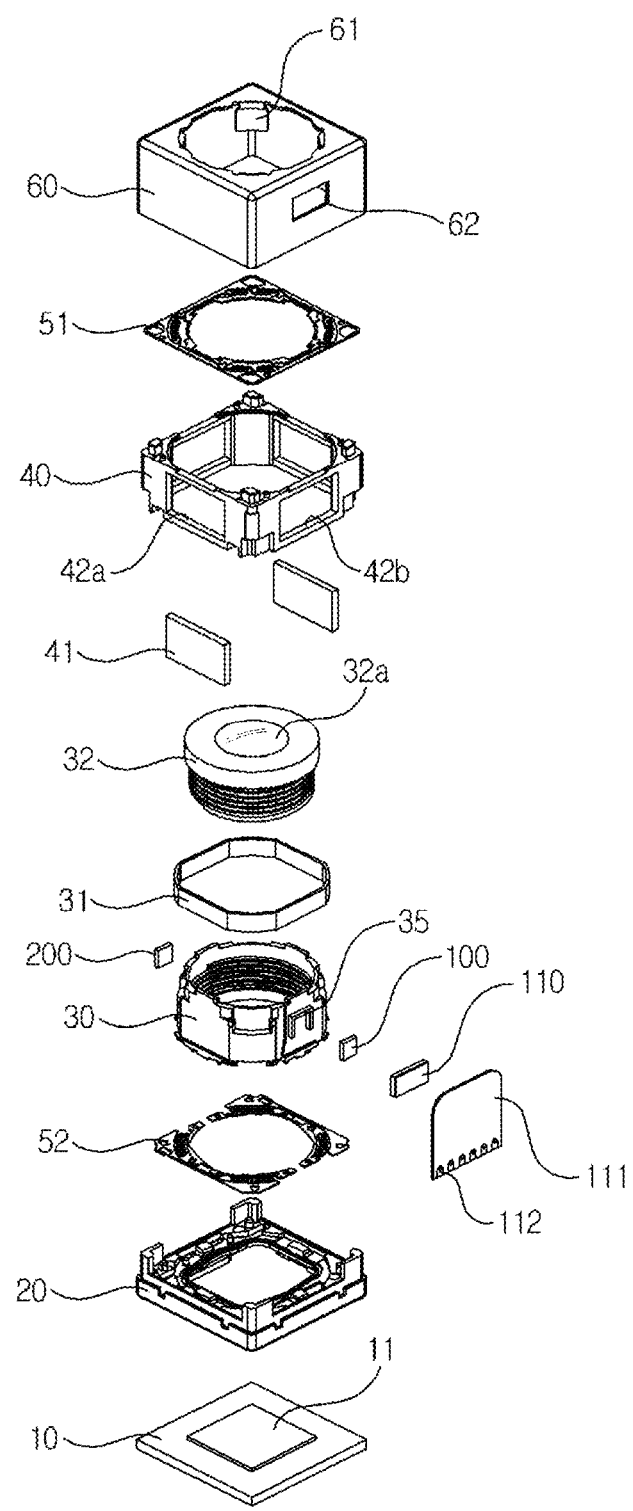
FIG. 2 is an exploded perspective view of FIG. 1.
Figure 3:
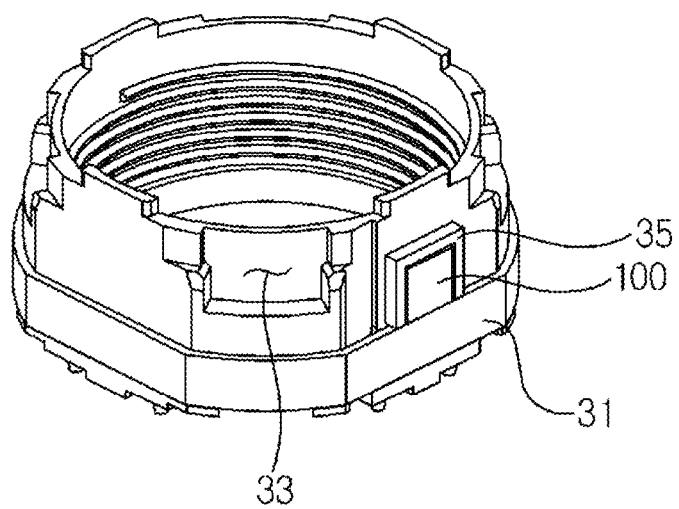
FIGS. 3 and 4 are perspective views illustrating an enlarged view of bobbin in FIG. 2.
Figure 4:
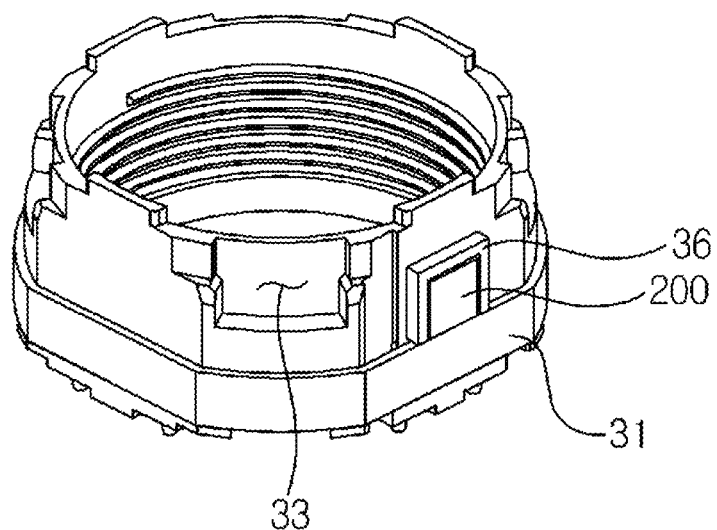
Figure 5:
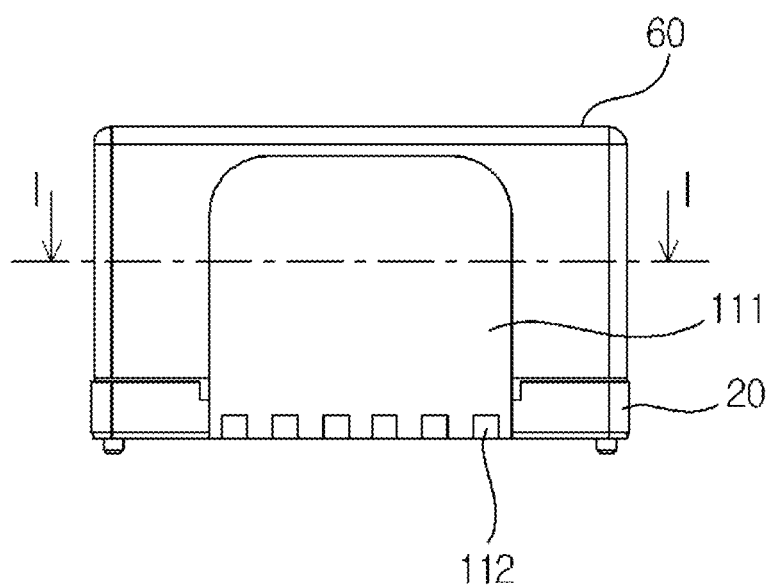
FIG. 5 is a front view of FIG. 1.
Figure 6:
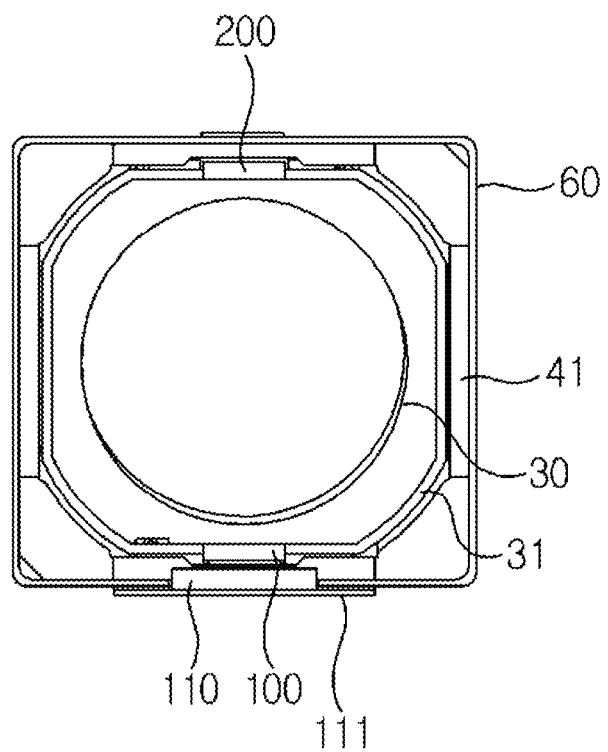
FIG. 6 is a cross-sectional view taken along line I-I of FIG. 5.
Figure 7:
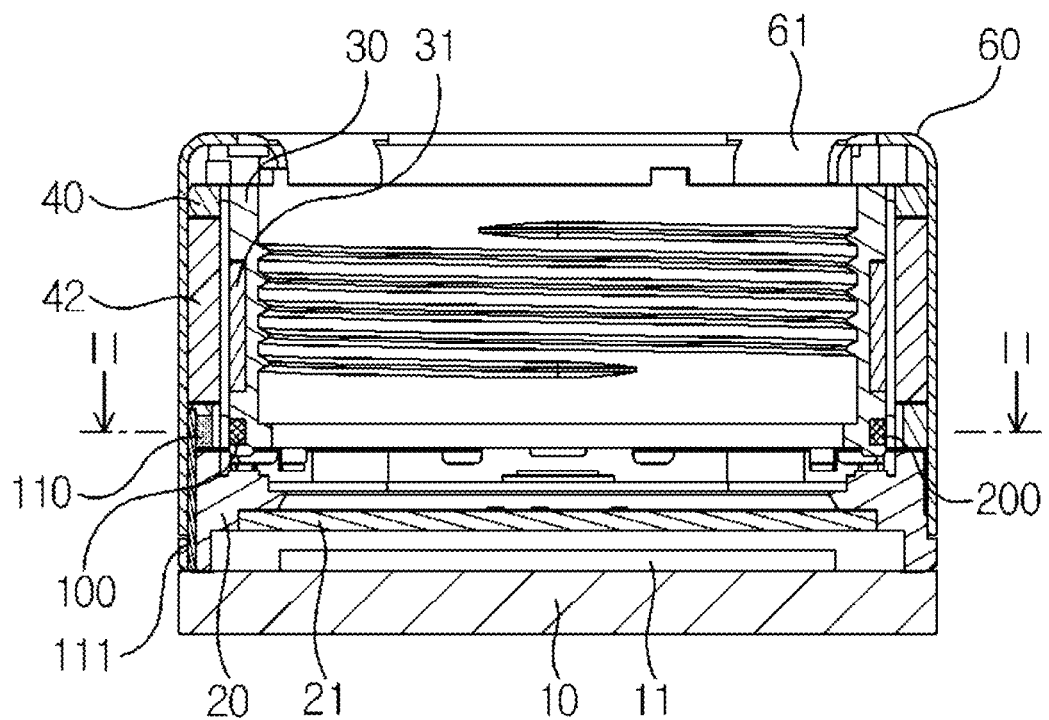
FIG. 7 is a schematic cross-sectional view illustrating a lens moving unit according to another exemplary embodiment of the present disclosure.
Figure 8:
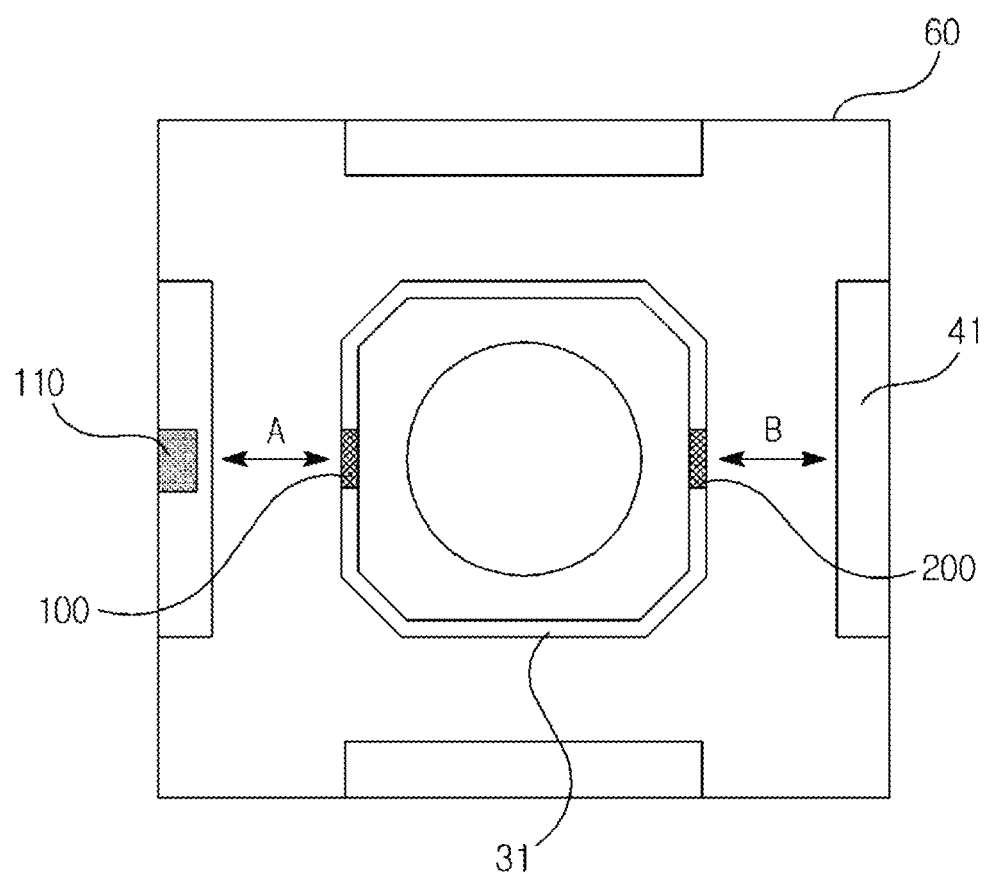
FIG. 8 is a schematic cross-sectional view taken along line II-II of FIG. 7.
Figure 9:
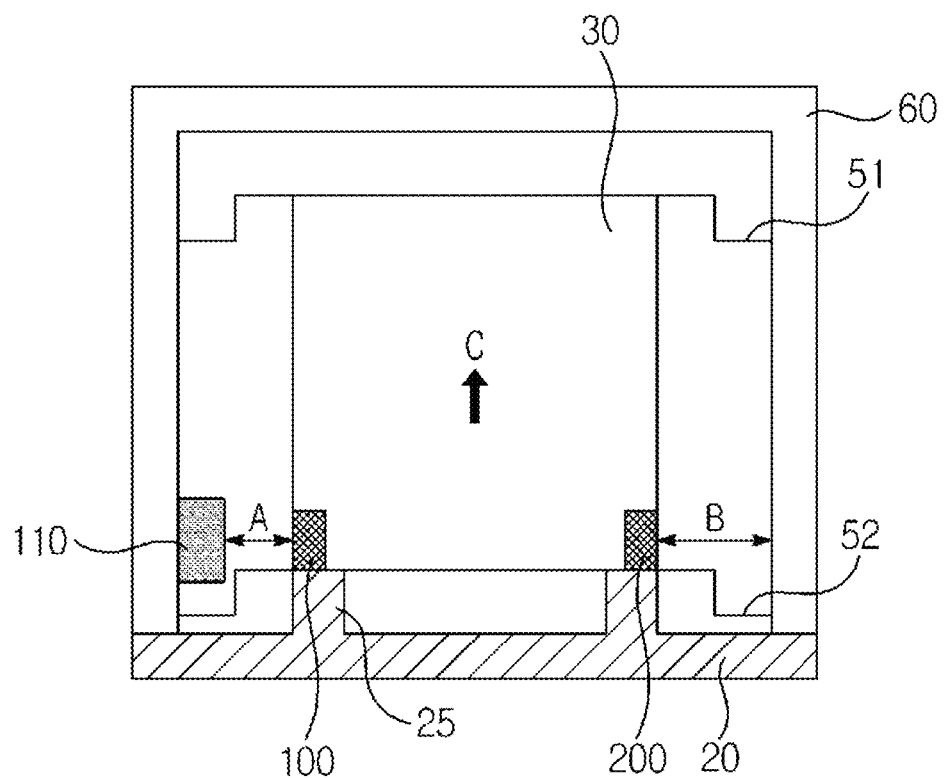
FIG. 9 is a schematic view illustrating a unidirectional control lens moving unit.
Figure 10:
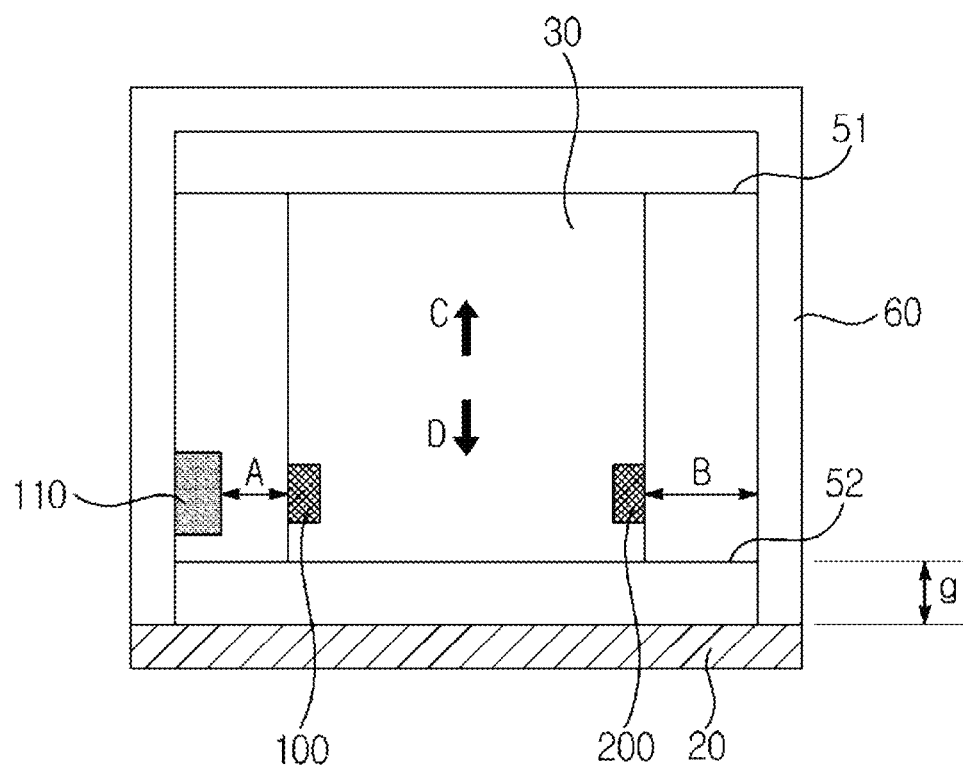
FIG. 10 is a schematic view illustrating a bidirectional control lens moving unit.

FIG. 1 is a schematic perspective view illustrating a camera module according to an exemplary embodiment of the present disclosure, FIG. 2 is an exploded perspective view of FIG. 1, FIGS. 3 and 4 are perspective views illustrating an enlarged view of bobbin in FIG. 2, FIG. 5 is a front view of FIG. 1, FIG. 6 is a cross-sectional view taken along line I-I of FIG. 5, FIG. 7 is a schematic cross-sectional view illustrating a lens moving unit according to another exemplary embodiment of the present disclosure, FIG. 8 is a schematic cross-sectional view taken along line II-II of FIG. 7, FIG. 9 is a schematic view illustrating a unidirectional control lens moving unit, and FIG. 10 is a schematic view illustrating a bidirectional control lens moving unit.

Referring to FIGS. 1 and 2, a lens moving unit according to an exemplary embodiment of the present disclosure may include a base (20), a bobbin (30) and a cover member (60). Although the cover member (60) may form an external look of a camera module, a housing member (40) configured to support a magnet (41, described later) may be further arranged inside the cover member (60), as illustrated in FIGS. 1 and 2. The base (20) may be coupled to the cover member (60). The bobbin (30) may be reciprocally mounted at an inner space of the cover member (60) to an optical axis direction.

The bobbin (30) may be mounted at upper and bottom surfaces with upper and bottom elastic members (51, 52) respectively. The upper elastic member (51) may be connected at one end to the bobbin (30) and to the cover member (60) or the housing member (40) at the other end. When the upper elastic member (51) is connected to the housing member (40), the upper elastic member (51) may be connected to an upper surface or a bottom surface of the housing member. The bottom elastic member (52) may be connected at one end to the bobbin (30) and to an upper surface of the base (20) or to a bottom surface of the housing member (40) at the other end.

Furthermore, the base (20) may be formed at a bottom surface with a protrusion to be coupled to the bottom elastic member (52). A hole or a recess may be formed at a position corresponding to that of the bottom elastic member (52), the coupling of which may fix the bottom elastic member (52) and inhibit rotation. An adhesive agent may be added for further fixation.

Referring to FIG. 2 again, the upper elastic member (51) may be formed in one body, and the bottom elastic member (52) may be provided in a bisectional structure of two springs to serve as terminals for reception of a current. That is, a current applied through a terminal (not shown) is transmitted through the two springs of the bottom elastic member (52), where the current may be applied to a coil unit (31) wound on the bobbin (30). To this end, the bottom elastic member (52) and the coil unit (31) may be conductively connected using a soldering. That is, distal ends of the two springs and the coil unit (31) may be electrically connected using soldering, Ag, epoxy, welding or conductive epoxy. However, the present disclosure is not limited thereto, and conversely, the upper elastic member (51) may be formed in a bisectional structure and the bottom elastic member (52) may be integrally formed.

The bobbin (30) may be supported in bidirectional movement of optical axis direction by the upper and bottom elastic members (51, 52). That is, the bobbin (30) may be spaced apart from the base (20) at a predetermined distance to be controlled in movement toward upper and bottom sides about an initial position of the bobbin (30). Furthermore, the initial position of the bobbin (30) may be an upper surface of the base (20) to be controlled in movement only to the upper side about the initial position of the bobbin (30).

Meanwhile, the coil unit (31) may be provided in a ring-shaped coil block coupled to a periphery of the bobbin (30). However, the present disclosure is not limited thereto, and a coil unit (31) may be formed by a coil being directly wound on a periphery of the bobbin (30). The coil unit (31) may be mounted at a position near to a bottom surface of the bobbin (31) and may include a straight surface or a curved surface depending on a shape of the bobbin (31), as illustrated in FIG. 3.

The coil unit (31) formed in a coil block may be formed with an angular shape, or may be formed with an octagonal shape. That is, the coil unit (31) may be formed with a straight surface less a curved surface, which is in consideration of electromagnetic interaction with a magnet (41) that is oppositely arranged, and when a surface opposite to the magnet (41) is of a plain surface, an opposite surface of the coil unit (31) may be also of a plain surface to thereby maximize an electromagnetic force. However, the present disclosure is not limited thereto, and a surface of the coil unit (31) and a surface of the magnet (41) may be of curved surface, or of plain surface, or one of the surfaces of the coil unit (31) and the magnet (41) may be formed with a curved surface or a plain surface.

Furthermore, the bobbin (30) may include a first surface flatly formed on a surface opposite to the straight surface to allow the coil unit (31) to be coupled to a periphery, and a second surface roundly formed at a surface corresponding to the curved surface, but the second surface may be a flatly formed surface. At this time, an upper side of the second surface may be formed with a concave groove (33) corresponding to an inner yoke (61, described later) and the coil unit (31) may be arranged at a bottom surface of the concave groove (33), but a part of the coil unit (30) may be arranged up to a vicinity of the concave groove (33). However, the present disclosure is not limited thereto, and a separate yoke may be additionally installed instead of the inner yoke (61).

The housing member (40) may be formed with a frame that takes an approximately hexahedronal shape. Upper surface and bottom surface of the housing member (40) may be respectively provided with a coupling structure to allow the upper/bottom elastic members (51, 52) to be coupled, and a lateral surface of the housing member (40) may be mounted with a magnet (41). At this time, the housing member (40) may be formed with a mounting hole (42a) mounted with the magnet (41) as illustrated in FIG. 2, where the magnet (41) may be arranged at the mounting hole (42a) to be fixed to the cover member (60). However, the present disclosure is not limited thereto, and the housing member (40) may be directly adhered to and fixed at an inner surface with the magnet (41) without the mounting hole (42a). When the magnet (41) is directly fixed to the housing member (40), the magnet (41) may be directly bonded and fixed to a lateral surface or to a corner of the housing member (40).

Furthermore, the housing member (40) may be additionally provided with a through hole (42b) in addition to the mounting hole (42a), where the through hole (42b) may be formed in a pair each facing the other as illustrated. However, the present disclosure is not limited thereto. That is, a through hole (42b) may be formed at a wall surface of the housing member (40) opposite to a sensing magnet (100, described later), where the through hole (42b) may be greater than the sensing magnet (100). At this time, the through hole (42b) may be of square shape, a round shape or a polygonal shape. Alternatively, two mounting holes (42a) may be mounted with the magnet (41) and remaining two mounting holes (42a) may be used as through holes (42b) by using a housing member (40) having preexisting four mounting holes (42a). Furthermore, only cover member (60) may be present without a separate housing member (40) unlike the present exemplary embodiment. The cover member may be formed with a metal material of ferromagnetic substance such as an iron. Furthermore, the cover member (60) may be provided in an angular shape when viewed from an upper side so as to wrap the entire bobbin (30). At this time, cover member may take a square shape as illustrated in FIG. 1, or may take an octagonal shape, albeit not being illustrated. Furthermore, when the cover member takes an octagonal shape when viewed from an upper side, and when the magnet (41) arranged at a corner of the housing member (40) takes a trapezoidal shape when viewed from an upper side, the magnetic field emitted from the corner of the housing member can be minimized.

The cover member (60) may be integrally formed with an inner yoke (61) at a position corresponding to that of a reception groove, where the inner yoke (61) according to the exemplary embodiment of the present disclosure may be spaced apart at one side surface from the coil unit (31) at a predetermined distance, and may be spaced apart at the other side surface from the bobbin (30) at a predetermined distance. The inner yoke (61) may be formed at four corners of the housing member (40). The inner yoke (61) may be inwardly bent from an upper side surface to a direction parallel with an optical axis. The inner yoke (61), albeit not illustrated, may be formed with an escape groove at a position near to the bent portion. The escape groove may be formed in a pair or diagonally formed, and a bent portion of the escape groove may be formed with a bottleneck section which can minimize interference between the inner yoke (61) and the bobbin (30) when the bobbin horizontally moves.

That is, the bobbin (30) may be inhibited from being partially damaged by interference at a corner portion of the inner yoke (61) when the bobbin (30) moves upwards. A distal end of the inner yoke (61) requires to be spaced apart at a reference position from a floor surface of the concave groove (33), the requirement of which is to inhibit contact and interference between the distal end of the inner yoke (61) and the floor surface of the concave groove (33) when the bobbin (30) reciprocates at a highest position. Furthermore, the distal end of the inner yoke (61) may function as a stopper that regulates movement of the bobbin (30) up to a section other than that of a design specification. Still furthermore, when there is no separate housing member (40), the magnet (41) may be directly bonded and fixed to a lateral surface or to a corner of the cover member (60). A magnetization direction of the magnet (41) may be a side facing the bobbin (30) or a surface facing the cover member (60). However, the present disclosure is not limited thereto, and the magnetization direction may be changed depending on design.

Meantime, the lens moving unit according to an exemplary embodiment of the present disclosure may be provided with a detection unit configured to detect movement of the bobbin (30). The detection unit may include a sensing magnet (100) and a position detection sensor (110), where the position detection sensor (110) may be mounted on a circuit substrate (111).

The sensing magnet (100) may be formed thinner and smaller than the magnet (41), and albeit not illustrated, may be provided in a square shape. However, the present disclosure is not limited thereto, and the sensing magnet (100) may be formed in various shapes such as a rectangular shape, a triangular shape, a polygonal shape or a round shape.

The sensing magnet (100) may be mounted at a periphery of the bobbin (30), and may be fixed to a sensing magnet mounting unit (35) provided at the bobbin (30) using an adhesive according to the exemplary embodiment of the present disclosure. At this time, the sensing magnet mounting unit (35) may include a rib-shaped guide protrusively formed from the periphery of the bobbin (30), but the present disclosure is not limited thereto, and the sensing magnet mounting unit (35) may be formed with a groove part to be arranged by the sensing magnet (100). The rib-shaped guide may be formed at a lower side with an opening, as illustrated in FIG. 3, and may be provided to wrap at least three surfaces of the sensing magnet (100).

At this time, a protruding height of the guide at the sensing magnet mounting unit (35) may correspond to thickness of the sensing magnet (100) or lower or higher than the sensing magnet (100). Thus, when the sensing magnet (100) is fixed to the sensing magnet mounting unit (35) using an adhesive, the sensing magnet (100) may protrude or may not protrude outside of the guide.

The sensing magnet (100) may be arranged at a position not interfered by the coil unit (31). That is, when the coil unit (31) is mounted at a lower side of the bobbin (30) as illustrated in FIG. 3, the sensing magnet (100) may be arranged at an upper side of the bobbin (30), and conversely, the sensing magnet (100) may be arranged at a lower side of the bobbin (30), the position of which is to inhibit the coil unit (31) from influencing on axial lifting operation of the bobbin (30). However, the sensing magnet (100) may be arranged between the coil unit (31) and the bobbin (30), or may be arranged at an upper surface of the coil unit (31) opposite to the cover member (60) or to the housing member (40).

Referring to FIG. 2, the sensing magnet (100) may be so arranged as not to face the magnet (41). That is, two magnets (41) may be provided in a pair, one of the pair being parallel to and facing each other. At this time, when the housing member (40) is provided in a square shape, the sensing magnet (100) may not be mounted on a position opposite to two surfaces mounted with the magnets (41). The reason of arranging the sensing magnet (100) not to face the magnets (41) is to allow the position detection sensor (110) to accurately feedback the movement of the bobbin (30) by inhibiting changes in magnetic force of the sensing magnet (100) from interfering with the magnetic force of the magnets (41). Furthermore, the sensing magnet (100) may not face the magnets (41) to be arranged at an upper surface or a lower surface of the magnet (41).

Furthermore, the sensing magnet (100) may have vertically different poles, that is, an upper side of the sensing magnet with an N pole and a lower side with an S pole, or vice versa, whereby vertical movement of the sensing magnet (100) can be detected by the position detection sensor (110) to allow grasping an exact vertical movement of the bobbin (30).

Referring to FIG. 2 again, the circuit substrate (111) may be arranged to correspond to each wall of the bobbin (30) and the housing member (40) and/or the cover member (60). In the exemplary embodiment of the present disclosure, the cover member (60) may be provided to function as a shield can, and the circuit substrate (111) may be arranged at or may contact a lateral wall of the cover member (60). Furthermore, the circuit substrate (111) may be arranged at or may contact an outside surface or inner side surface of the cover member (60) or the housing member (40), as illustrated in FIGS. 7 and 8.

Meanwhile, when the circuit substrate (111) is arranged at an outside of the cover member (60), the circuit substrate (111) may be formed greater than a window (62) formed at the cover member (60) to thereby cover the window (62). Furthermore, the circuit substrate (111) may include, at a distal end, a terminal (112) to allow being electrically connected to the PCB (10) mounted with the image sensor (11, described later).

Furthermore, in order to allow a current to be applied to the coil unit (31) through the circuit substrate (111), the coil unit (31) may be directly connected to the circuit substrate (111) or the coil unit (31) may be connected to bisected bottom springs to allow the bisected bottom springs to be electrically connected to the circuit substrate (111) and to a PCB (100). The electrical connection may be variably implemented using soldering, conductive epoxy and Ag epoxy. Furthermore, the circuit substrate (111) may be electrically connected to the PCB (10), which is a constituent part of a camera module, in order to receive an external electric power. At this time, the position detection sensor (110) such as a Hall sensor is arranged at an inner side of the circuit substrate (111), where the position detection sensor (110) is not exposed to the outside. A lateral wall of the cover member (60) opposite to the position detection sensor (110) may be provided with a window (62), and a through hole (42b) may be also formed at the housing member (40) and the position detection sensor (110) may pass the window (62) to be spaced apart from the sensing magnet (100) at a predetermined distance.

The through hole (42b) formed at the housing member (40) may be provided with a shape corresponding to that of the mounting unit (42a) mounted with the magnet (41), and may be formed with a through hole having a width and a height greater than those of the sensing magnet (100). The circuit substrate (111) arranged with the position detection sensor (110) may be fixed to an inner surface of the cover member (60), where the cover member (60) may not be formed with a window. Furthermore, there may be no housing member (40), and a center of the position detection sensor (110) and a center of the sensing magnet (100) may be matched.

The circuit substrate (111) may be formed with a plurality of terminals (112). These terminals (112) may output a detection signal of the position detection sensor (110) or apply a current to the coil unit (31).

As discussed from the foregoing, the exemplary embodiment of the present disclosure can shorten a time for auto focusing operation by way of receiving a feedback of an axial movement of bobbin (30) using the sensing magnet (100). Furthermore, operation is performed while the coil unit (31) is wound on the bobbin (30), a sensing magnet (100) smaller than an auto focusing magnet is attached to the bobbin (30) and the position detection sensor (110) configured to detect the magnetic force of the sensing magnet (100) is tightly arranged to a wall surface of one side of the lens moving unit, whereby an auto focusing function can be accurately and quickly performed free from fear of degradation in response characteristics.

Furthermore, a center of the position detection sensor (110) and a center of the sensing magnet (100) can be matched, and a lengthwise (two magnetized portions) center of the sensing magnet (100) may be matched to a center of the position detection sensor (110). A surface of the sensing magnet (100) opposite to the position detection sensor (110) may be magnetized at two sections to allow detecting a position.

Furthermore, a lengthwise length of the through hole (42b) and/or the window (62) may be formed greater than space of the sensing magnet (100) that moves along a vertical direction of the bobbin (30) and/or size of the position detection sensor (110). The position detection sensor (110) may include any of a gyro sensor, an angular velocity sensor and a photo reflector configured to detect a position. A surface opposite to a surface mounted with the sensing magnet (41) of the bobbin (30) may be formed with a correction magnet (200) as illustrated in FIGS. 2, 4, 5 and 6.

The correction magnet (200) may be formed at a periphery of the bobbin (30), and may be fixed to a correction magnet mounting unit (36) provided at the bobbin (30) using an adhesive. At this time, the correction magnet mounting unit (36) may include a rib-shaped guide protrusively formed from the periphery of the bobbin (30). However, the present disclosure is not limited thereto, and the correction magnet mounting unit (36) may be formed with a groove part that may be arranged by the correction magnet (200). The rib-shaped guide may include, at a lower surface, an opening as illustrated in FIG. 4, to wrap at least three surfaces of the correction magnet (200).

At this time, a protrusive height of the guide of the correction magnet mounting unit (36) may be formed lower or higher than thickness of the correction magnet (200). Thus, when the correction magnet (200) is fixed to the correction magnet mounting unit (36) using an adhesive, the correction magnet (200) may protrude or may not protrude outside of the guide.

The sensing magnet (100) and the correction magnet (200) may be provided in the same size. Furthermore, a center of the sensing magnet (100) and a center of the correction magnet (200) may be mutually aligned. That is, an imaginary extension line connecting the center of the sensing magnet (100) and the center of the correction magnet (200) may be so arranged as to pass a center of the bobbin (30), whereby attractive forces among the sensing magnet (100), the correction magnet (200) and the cover member (60) (arrows A and B, see FIG. 8) may be offset and whereby a center of the bobbin (30) is not pulled and leaned to a cover member (60) side.

In other words, as illustrated in FIG. 8, assuming that an attractive force formed between the sensing magnet (100) and the cover member (60) is 'A', and an attractive force formed between the correction magnet (200) and the cover member (60) is 'B', A becomes B, that is A=B. Thus, the bobbin (30) is not leaned towards the cover member (60) side, and may be arranged at a center area where the attractive forces among the sensing magnet (100) and the correction magnet (200) and the cover member (60) are stabilized, whereby it is possible for the center of the bobbin (30) and an optical axis move in an aligned state to an optical axis direction.

Meantime, although the exemplary embodiment of the present disclosure has explained and illustrated that the sensing magnet (100) and the correction magnet (200) are arranged to face a flat straight surface side of the cover member (60), the present disclosure is not limited thereto, and the sensing magnet (100) and the correction magnet (200) may be arranged to face a corner side of the cover member (60). In this case, the position detection sensor (110) may be arranged at a corner side of the cover member (60) corresponding to the sensing magnet (100).

Meanwhile, the position detection sensor may be singly formed or may be mounted on a predetermined circuit substrate (111) by arranging the circuit substrate (111) as illustrated in FIGS. 1 to 6. At this time, the circuit substrate (111) may be exposed outside of the cover member (60) as illustrated in FIGS. 1 to 6, and 1, or the position detection sensor (110) may be mounted while the circuit substrate (111) is embedded inside of the cover member (60). Albeit not being illustrated, the circuit substrate (111) may be mounted at an inner surface of the cover member (60) or at a corner. Furthermore, it is possible to supply a current to a coil unit (22) wound on the bobbin (30) through the circuit substrate (111).

As discussed from the foregoing, the sensing magnet (100) is attached to an external wall of the bobbin (30), the position detection sensor (110) configured to detect the magnetic force of the sensing magnet (100) is arranged at a wall surface at one side of the cover member (60), whereby information on position of the bobbin (30) can be received in real time to allow performing an accurate auto focusing function over the conventional lens moving unit.

Particularly, the correction magnet (200) having a same size and magnetic force as those of the sensing magnet (100) to inhibit the bobbin (30) from leaning toward the cover member (60) side due to generation of attractive force between the sensing magnet (100) and the cover member (60) of ferromagnetic substance is mounted in a center-aligned state at a side opposite to that of the bobbin (30), whereby the bobbin (30) can maintain a constant position at all times relative to the center of the cover member (60).

Meanwhile, the lens moving unit having the sensing magnet (100) and the correction magnet (200) thus illustrated as in FIGS. 1 to 8 may perform a single direction control as illustrated in FIG. 9 and also control a bidirectional control as illustrated in FIG. 10.

That is, as illustrated in FIG. 9, the base (20) and the bobbin (30) are tightly arranged at an initial position. For example, a stopper (25) may be protruded from a base (20) side to contact a floor surface of the bobbin (30) and to form the initial position, or conversely, albeit not illustrated, a stopper may be protruded from a floor surface of the bobbin (30) to allow the stopper to contact an upper surface of the base (20). In this case, the upper and bottom elastic members (51, 52) are in a state of being added with a pre-load of a predetermined size to allow the initial position of the bobbin (30) to be tightly formed with the base (20), such that when an electric power is applied, the bobbin (30) rises toward an arrow C direction due to electromagnetic interaction, and when the electric power is cut off, the bobbin (30) may return to an initial position by restoring force of the upper/bottom elastic members (51, 52).

Alternatively, as illustrated in FIG. 10, the base (20) and the bobbin (30) may be spaced apart from an initial position at a predetermined distance (g). In this case, although the upper/bottom elastic members (51, 52) may be formed in a no pre-loaded flat state, the upper/bottom elastic members (51, 52) may be also formed in a pre-loaded state of a predetermined size. In this case, when an electric power is applied while the base (20) and the bobbin (30) are spaced apart from an initial position at a predetermined distance (g), the bobbin (30) may rise to an arrow C direction based on an initial position depending on polarity of the applied current when an electric power, e.g., a constant current is applied, and may descend to an arrow D direction based on an initial position when a reverse current is applied.

In performing the auto focusing function by moving the bobbin (30) to an arrow C direction or to an arrow D direction, the exemplary embodiment of the present disclosure can minimize a time for auto focusing operation by ascertaining a more accurate position of the bobbin (30) using the sensing magnet (100). Particularly, the correction magnet (200) mounted at a position opposite to that of the sensing magnet (100) can offset the attractive force between the sensing magnet (100) and the cover member (60), whereby the bobbin (30) can move maximally while maintaining a coaxial state with the cover member (60). A camera module may include a lens moving unit thus mentioned, a lens barrel (32) coupled to the bobbin (30), an image sensor (11) and a PCB (10). At this time, the PCB (10) may be mounted with the image sensor (11) to form a floor surface of the camera module.

The bobbin (30) may include therein a lens barrel (32) mounted with at least one lens (32a), where the lens barrel

(32) may be so formed as to be screw-connected to an inside of the bobbin (30) as illustrated in FIG. 2. However, the present disclosure is not limited thereto, and albeit not illustrated, the lens barrel (32) may be directly fixed to an inside of the bobbin (30) by a method other than the screw-connecting method, or the at least one lens (32a) may be integrally formed with the bobbin (30). An optical system may be formed by using the lens (32a) of one sheet, two sheets or more than two sheets.

The base (20) may be additionally formed with an infra-red cut-off filter (21, see FIG. 7) at a position corresponding to that of the image sensor (11), and may be coupled to the housing member (40). Furthermore, the base (20) may support a bottom side of the housing member (40). The base (20) may be mounted with a separate terminal member for conductivity with the PCB (10) and may be integrally formed with the terminal using a surface electrode. Meantime, the base (20) can function as a sensor holder configured to protect the image sensor (11), where a protrusion may be formed downwards along a lateral surface of the base (20). However, the protrusion is not an essential part and albeit not illustrated, a separate sensor holder may be arranged at a lower side of the base (20) to function the role of the protrusion.

Hereinafter, a camera module according to another exemplary embodiment of the present disclosure will be described with reference to the accompanying drawings. Meanwhile, the camera module according to another exemplary embodiment of the present disclosure will be described by inferring to the description of the camera module according to an exemplary embodiment of the present disclosure.

Figure 11:
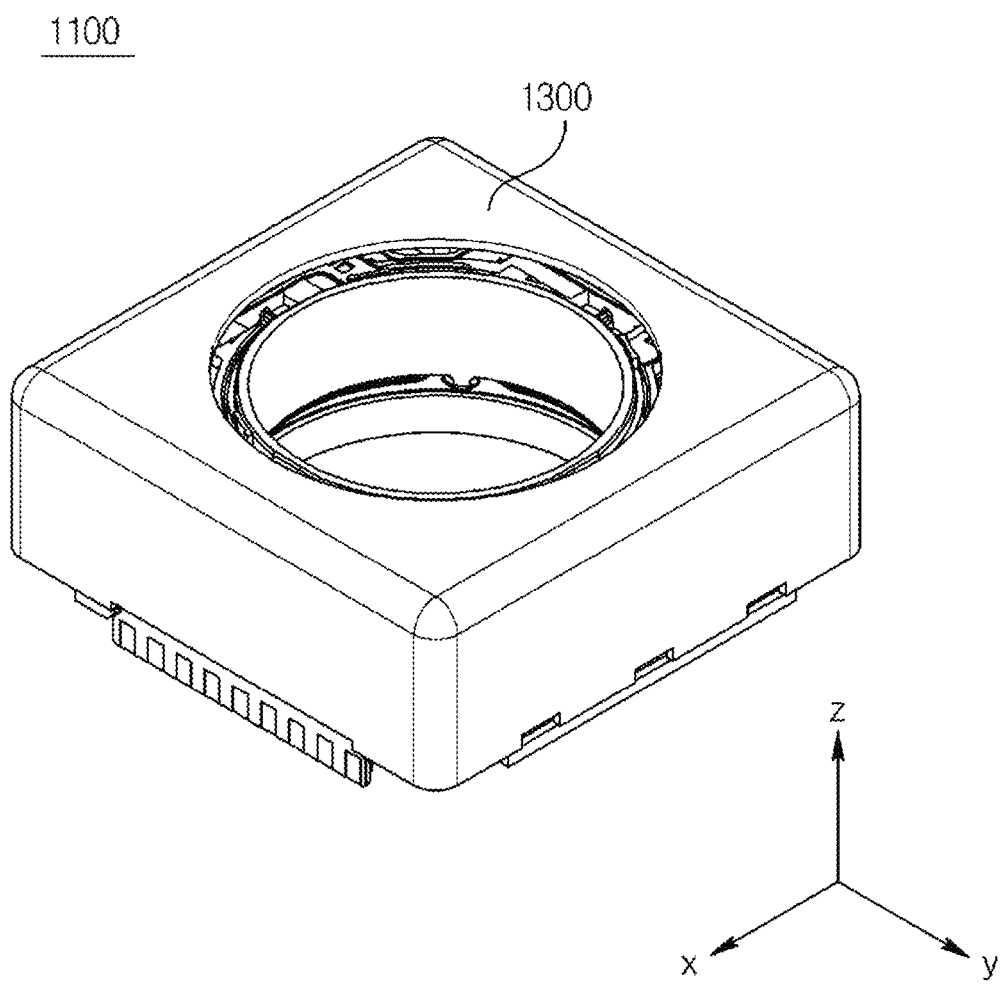
FIG. 11 is a perspective view illustrating a camera module according to another exemplary embodiment of the present disclosure.
Figure 12:
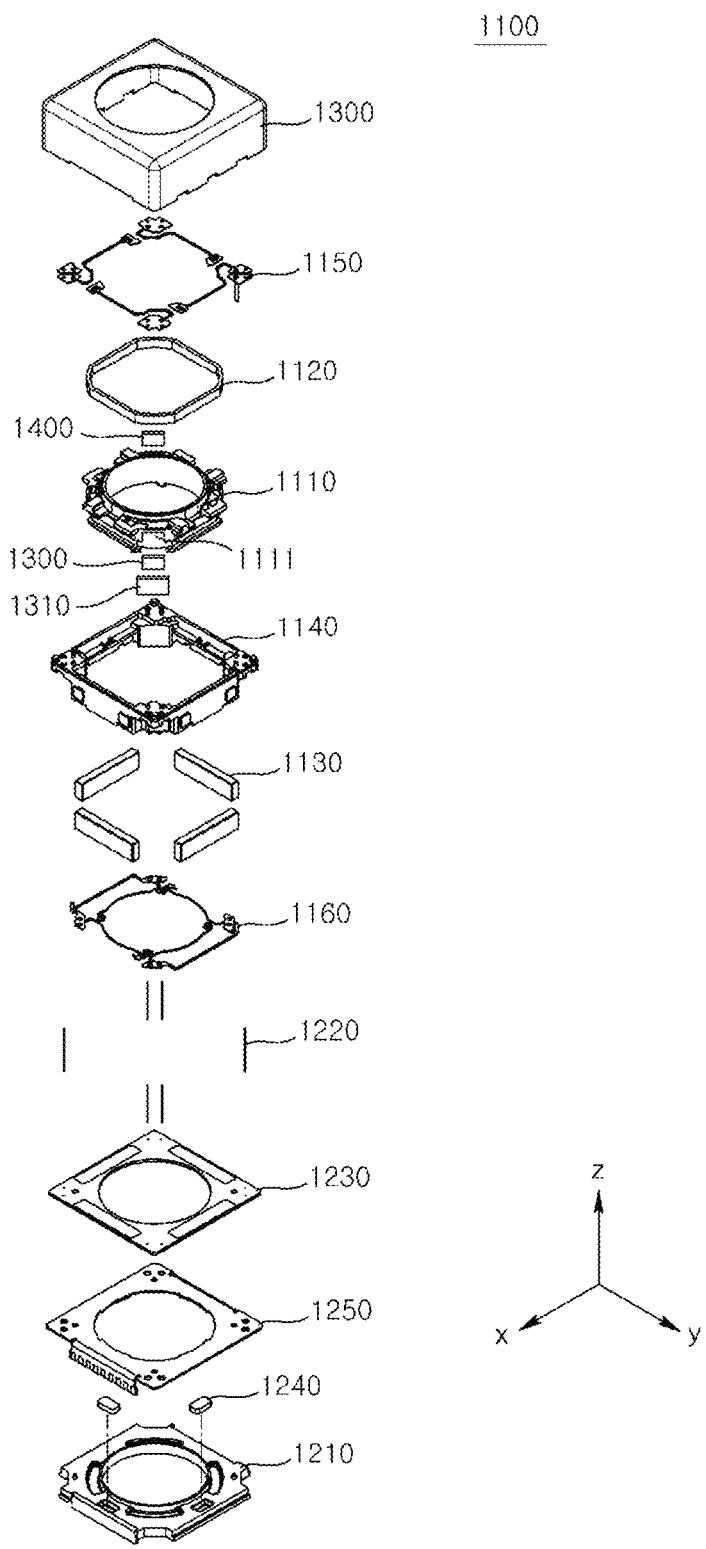
FIG. 12 is an exploded perspective view of a camera module according to another exemplary embodiment of the present disclosure.

FIG. 11 is a perspective view illustrating a camera module according to another exemplary embodiment of the present disclosure, and FIG. 12 is an exploded perspective view of a camera module according to another exemplary embodiment of the present disclosure.

The camera module according to another exemplary embodiment of the present disclosure may include an image sensor (not shown), a PCB (not shown) and a lens moving unit (1100).

The image sensor may receive an image incident through the lens moving unit (1100). Meantime, the image sensor may be mounted on the PCB. That is, the PCB may be mounted with the image sensor. Furthermore, the PCB may be coupled by the lens moving unit (1100). The lens moving unit (1100) may be coupled to the PCB to transmit an image to the image sensor. Hereinafter, the lens moving unit (1100) will be described in more details.

The lens moving unit (1100) according to an exemplary embodiment of the present disclosure may include a first lens moving unit, a second lens moving unit and a cover member (1300).

The first lens moving unit may perform a function of an auto focusing device. That is, the first lens moving unit may perform a function of moving a bobbin (110) to a first direction by interaction between a first mover (1120) and a second mover (1130). For example, the first mover (1120) and the second mover (1130) may be coils or magnets.

The second lens moving unit may perform a function of a handshake correction device. That is, the second lens moving unit may move an entire or a part of the first lens moving unit to a direction different from a first direction by interaction between the second mover (1130) and a third mover (1230). At this time, the second mover (1130) and the third mover (1230) may be a coil or a magnet.

The cover member (1300) may be a hexahedron forming an inner space therein. Meantime, the inner space may accommodate the first lens moving unit and the second lens moving unit. Furthermore, the cover member (1300) may be formed with a metal material of ferromagnetic substance such as an iron. In this case, the cover member (1300) may generate an attractive force between a sensing magnet (1300, described later) and a correction magnet (1400), the details of which will be described later.

The cover member (1300) may be positioned at an inner space with a bobbin (1110), a housing (1140) and a base (1210). The bobbin (1110) may be positioned thereinside with a lens (not shown). The lens may be screw-connected to an inner surface of the bobbin (1110). The bobbin (1110) may be positioned at an outside with a first mover (1120). The first mover (1120) may be a coil. The first mover (1120) may be a magnet. However, the present disclosure is not limited thereto, and the first mover (1120) may be coupled to a periphery of the bobbin (1110). The first mover (1120) may move the bobbin (1110) to a vertical direction (optical axial direction of lens) through an electromagnetic interaction with the second mover (1130).

The bobbin (1110) may be positioned at an outside with a sensing magnet (1300). That is, the sensing magnet (1300) may be fixed by being inserted into a sensing magnet mounting unit (1111) formed at a periphery of the bobbin (1110). At this time, the description of the sensing magnet mounting unit (1111) may be described by inferring to the description of the sensing magnet mounting unit (35) in the previous exemplary embodiment of the present disclosure. Furthermore, the sensing magnet (1300) may be fixed to a periphery of the bobbin (1110) using an adhesive. The sensing magnet (1300) may be detected by a position detection sensor (1310) positioned at the housing (1140). That is, when the bobbin (1110) moves, the sensing magnet (1300) also moves at the same time, where the position detection sensor (1310) can detect a position change of the sensing magnet (1300). Meanwhile, the sensing magnet (1300) may be a Hall sensor, for example. The Hall sensor can sense a difference of electromagnetic force sensed in response to movement of the sensing magnet (1300). That is, the Hall sensor can sense the electromagnetic force of the magnet (1300) to sense movement and position of the housing (1140).

Meantime, the bobbin (1110) may be positioned at an outside with a correction magnet (1400). That is, the correction magnet (1400) may be positioned at a periphery of the bobbin (1110). The correction magnet (1400) may be inserted into and fixed at a correction magnet mounting unit (not shown) formed at a periphery of the bobbin (1110), for example. Furthermore, the correction magnet (1400) may be fixed to the periphery of the bobbin (1110) using an adhesive.

The correction magnet (1400) may be positioned at an opposite side of the sensing magnet (1300). Meantime, the sensing magnet (1300) and the correction magnet (1400) may be formed in the same size. Furthermore, a center of the sensing magnet (1300) and a center of the correction magnet (1400) may be symmetrically formed. That is, an imaginary extension line connecting the center of the sensing magnet (1300) and the center of the correction magnet (1400) may be so arranged as to pass a center of the bobbin (1110), the configuration of which can offset attractive forces (arrows A, B, see FIG. 8) formed among the sensing magnet (1300), the correction magnet (1400) and the cover member (1300), whereby the center of the bobbin (1110) is inhibited from leaning toward a cover member (1300) side.

That is, assuming that an attractive force formed by a magnetic force between the sensing magnet (1300) and the cover member (1300) is 'A', and an attractive force formed by a magnetic force between the correction magnet (1400) and the cover member (1300) is 'B', the sensing magnet (1300) and the correction magnet (1400) may be so formed as to be A=B. In this case, the bobbin (1110) is inhibited from leaning or tilted toward the cover member (1300) side, whereby a center of the bobbin (1110) and an optical axis of the lens can move in an aligned state.

The sensing magnet (1300) and the correction magnet (1400) may be positioned at the bobbin (1110) to allow facing a corner side met by a lateral surface of the cover member (1300) as illustrated in FIG. 12, for example. Meantime, the sensing magnet (1300) and the correction magnet (1400) may be positioned to face a lateral surface of the cover member (1300). In this case, the sensing magnet (1300) and the correction magnet (1400) may be vertically spaced apart from the second mover (1130) formed with the magnet. That is, the sensing magnet (1300) and the correction magnet (1400) may be so positioned as not to horizontally overlap the second mover (1130) formed with the magnet. In other words, the sensing magnet (1300) may be so positioned as not to be interrupted by the second mover (1130) when the position detection sensor (1310) detects the sensing magnet (1300).

The housing (1140) may be positioned at an outside of the bobbin (1110). That is, the bobbin (1110) may be positioned at an inside of the housing (1140). The housing (1140) may be positioned with the second mover (1130). The second mover (1130) may be a coil or a magnet, for example. The second mover (1130) can vertically move (to an optical axis direction of lens) the bobbin (1110) relative to the housing (1140) through an interaction with the first mover (1120). Meantime, the second mover (1130) can move the housing (1140) and the bobbin (1110) relative to the third mover (1230) through an interaction with the third mover (1230).

The housing (1140) may be positioned with the position detection sensor (1310). The position detection sensor (1310) may be positioned at an inner lateral surface of the housing (1140). The position detection sensor (1140) may be fixed to the inner lateral surface of the housing (1140) using an adhesive. Meantime, the housing (1140) may be formed with a detection sensor accommodation unit (not shown) coupled by the position detection sensor (1310). The position detection sensor (1310) can detect movement of the sensing magnet (1300) by being positioned to face the sensing magnet (1300). That is, the position detection sensor (1310) can sense the position or movement amount (travelled amount) of the bobbin (1110). Meantime, the the position or movement amount (travelled amount) of the bobbin (1110) detected by the position detection sensor (1310) may be used for auto focusing feedback. The position detection sensor (1310) may be formed with a Hall sensor, for example, to detect the sensing magnet (1300).

The position detection sensor (1310) may receive an electric power from a circuit substrate (1250) through a bottom support member (1160) or an upper support member (1150). Furthermore, the position detection sensor (1310) may transmit a sensing value of the position detection sensor (1310) to the circuit substrate (1250) through the bottom support member (1160) or the upper support member (1150).

The base (1210) may support the circuit substrate (1250). That is, the circuit substrate (1250) may be positioned at an upper surface of the base (1210). The circuit substrate (1250) may be formed with a terminal through which an electric power can be supplied from an outside. The circuit substrate (1250) may supply the received electric power to the third mover (1230) positioned at an upper surface.

Meantime, the circuit substrate (1250) may supply an electric power to the first mover (1120) and the position detection sensor (1310) through the bottom support member (1160), the upper support member (1150) and a lateral support member (1220). The circuit substrate (1250) may be an FPCB (Flexible Printed Circuit Board), for example, but the present disclosure is not limited thereto.

The base (1210) may be formed with a sensor accommodation hole positioned with a second sensor (1240, referred to as second sensor to distinguish from the position detection sensor 1310). That is, the second sensor (1240) may be positioned at the base. The second sensor (1240) can detect movement of the second mover (1130). That is, the second sensor (1240) can detect the movement of the housing (1140). Meantime, position or movement amount (travelled amount) of the housing (1140) sensed by the second sensor (1240) may be used for OIS (Optical Image Stabilization) feedback.

The circuit substrate (1250) may be positioned at an upper surface with the third mover (1230). That is, the third mover (1230) may be positioned at an upper surface of the circuit substrate (1250). The third mover (1230) may directly receive an electric power from the circuit substrate (1250) formed with an FP (Fine Pattern) coil, for example. The third mover (1230) may horizontally move the housing (1140) through an electromagnetic interaction with the second mover (1130).

The bobbin (1110) and the housing (1140) may be supported by the bottom support member (1160). Furthermore, the bobbin (1110) and the housing (1140) may be coupled to the upper support member (1150). Meantime, the bottom support member (1160) and the upper support member (1150) may be coupled by the lateral support member (1220). A bottom surface of the bobbin (1110) and a bottom surface of the housing (1140) may be coupled to the bottom support member (1160), and an upper surface of the bobbin (1110) and an upper surface of the housing (1140) may be coupled by the upper support member (1150). Meantime, the bottom support member (1160) and the upper support member (1150) may include an inner lateral unit coupled to the bobbin (1110), an outer lateral unit coupled to the housing (1140) and a connection unit configured to connect the inner lateral unit and the outer lateral unit.

In this case, the bottom support member (1160) or an inner lateral unit of the upper support member (1150) may supply an electric power to the first mover (1120). Furthermore, the bottom support member (1160) or an outer lateral unit of the upper support member (1150) may supply an electric power to the position detection sensor (1310). At this time, the bottom support member (1160) and the upper support member (1150) may be separated to at least two pieces in order to supply an electric power to the first mover (1120) formed with a coil, and may be separated to at least four pieces to supply an electric power to the position detection sensor (1310). Thus, the bottom support member (1160) and the upper support member (1150) may be separated to at least six pieces, and the lateral support member (1220) may be also formed with at least six pieces. However, a total of eight lateral support members (1220) may be formed in order to symmetrically support the bottom support member (1160) and the upper support member (1150).

As discussed from the foregoing, the camera module according to another exemplary embodiment of the present disclosure can perform an AF (Auto Focus) feedback using the sensing magnet (1300) and the position detection sensor (1310), and can perform an OIS feedback using the second mover (1130) and the second sensor (1240). Meantime, an attractive force generated between the sensing magnet (1300) and the cover member (1300) of metal material can be offset by forming the correction magnet (1400).

The previous description of the present disclosure is provided to enable any person skilled in the art to make or use the inventive disclosure. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

The invention claimed is:

1. A lens moving unit comprising:
 a base;
 a cover member coupled to the base comprising an upper plate and a plurality of lateral walls extending from the upper plate;
 a bobbin disposed in the cover member and configured to move in an optical axis direction;
 a pair of driving magnets disposed on the cover member;
 a coil disposed on the bobbin and facing the pair of driving magnets;
 a sensing magnet disposed on the bobbin;
 a correction magnet disposed on the bobbin; and
 a sensor configured to detect the sensing magnet,
 wherein the plurality of lateral walls of the cover member comprises first and second lateral walls opposite to each other, and third and fourth lateral walls disposed between the first and second lateral walls and opposite to each other,
 wherein the pair of driving magnets comprises a first magnet disposed on the first lateral wall of the cover member and a second magnet disposed on the second lateral wall of the cover member,
 wherein no driving magnet is disposed on the third lateral wall and the fourth lateral wall of the cover member,
 wherein the sensing magnet is disposed on a first surface of the bobbin corresponding to the third lateral wall of the cover member, and
 wherein the correction magnet is disposed on a second surface of the bobbin corresponding to the fourth lateral wall of the cover member.

2. The lens moving unit of claim 1, comprising a circuit board comprising a plurality of terminals,
 wherein the circuit board is disposed at a position corresponding to the third lateral wall of the cover member,
 wherein the sensor is disposed on the circuit board, and
 wherein the plurality of terminals is disposed on a bottom end of the circuit board.

3. The lens moving unit of claim 1, wherein the pair of driving magnets are parallel to each other, and
 wherein the cover member is formed of a metal material or a magnetic material.

4. The lens moving unit of claim 1, wherein the sensing magnet is disposed at a position not to face the pair of driving magnets, and the sensing magnet is smaller than the pair of driving magnets.

5. The lens moving unit of claim 1, wherein the sensing magnet is not overlapped with the third lateral wall of the cover member in a direction perpendicular to a surface of the third lateral wall that faces the bobbin.

6. The lens moving unit of claim 1, wherein the cover member is integrally formed with an inner yoke,
 wherein the inner yoke of the cover member comprises four inner yokes and the four inner yokes are disposed at a position corresponding four corners of the cover member, respectively, and
 wherein one side surface of the inner yoke is spaced apart from the coil, and the other side surface of the inner yoke is spaced apart from the bobbin.

7. The lens moving unit of claim 6, wherein the inner yoke comprises:
 a bent portion bent downwardly from the cover member; and
 a bottleneck section formed at positions adjacent to the bent portion, the bottleneck section of the inner yoke being symmetrically formed.

8. The lens moving unit of claim 1, wherein the first magnet is fixed to the first lateral wall of the cover member and the second magnet is fixed to the second lateral wall of the cover member by an adhesive, respectively.

9. The lens moving unit of claim 1, comprising:
 an elastic member coupled with the bobbin,
 wherein the elastic member comprises a lower elastic member coupled to a lower surface of the bobbin and an upper elastic member coupled to an upper surface of the bobbin,
 wherein the lower elastic member comprises a first spring and a second spring spaced apart from each other,
 wherein the first spring is electrically connected with one end of the coil,
 wherein the second spring is electrically connected with the other end of the coil, and
 wherein the first spring and the second spring are electrically connected to a circuit board.

10. The lens moving unit of claim 9, wherein at least a portion of the circuit board is disposed on a lateral surface of the base.

11. The lens moving unit of claim 1, wherein the sensor comprises a Hall sensor, and
 wherein the sensing magnet has vertically different poles.

12. The lens moving unit of claim 1, wherein the bobbin comprises a groove on the first surface of the bobbin facing toward the third lateral wall of the cover member, and
 wherein the sensing magnet is disposed in the groove of the bobbin.

13. The lens moving unit of claim 1, comprising a housing disposed between the cover member and the bobbin, and
 wherein the pair of driving magnets are disposed on the housing.

14. The lens moving unit of claim 1, wherein the sensing magnet and the correction magnet are so disposed as not to overlap with the pair of driving magnets in a direction from the sensing magnet toward the optical axis.

15. The lens moving unit of claim 1, wherein the sensing magnet faces the coil in the optical axis direction or contacts the coil.

16. The lens moving unit of claim 1, wherein the correction magnet disposed at a position symmetrical to that of the sensing magnet based on an optical axis.

17. The lens moving unit of claim 2, wherein the circuit board is disposed on the third lateral wall of the cover member, and
 wherein the circuit board is disposed on inner side of the third lateral wall of the cover member.

18. The lens moving unit of claim 1, wherein the sensing magnet is overlapped with the first lateral wall of the cover member in a direction perpendicular to a surface of the first lateral wall that faces the bobbin.

19. A camera module comprising: the lens moving unit of claim 1;
- a lens barrel coupled to the bobbin;
- an image sensor; and
- a PCB(Printed Circuit Board) mounted with the image sensor.

20. The camera module of claim 19, wherein the camera module is configured to perform AF(Auto Focus) by receiving a position information of the bobbin using the sensing magnet and the sensor.

21. A lens moving unit comprising:
- a base;
- a cover member coupled to the base comprising an upper plate and a plurality of lateral walls extending from the upper plate;
- a bobbin disposed on the base and configured to move in an optical axis direction;
- a pair of driving magnets disposed on the cover member;
- a coil disposed on the bobbin and facing the pair of driving magnets;
- a sensing magnet disposed on the bobbin;
- a correction magnet disposed on the bobbin;
- a sensor configured to detect the sensing magnet, wherein the plurality of lateral walls of the cover member comprises first and second lateral walls opposite to each other, and third and fourth lateral walls disposed between the first and second lateral walls and opposite to each other,
- wherein the pair of driving magnets comprises a first magnet disposed on the first lateral wall of the cover member and a second magnet disposed on the second lateral wall of the cover member,
- wherein no driving magnet is disposed on the third lateral wall and the fourth lateral wall of the cover member,
- wherein the sensing magnet is disposed on a first surface of the bobbin corresponding to the third lateral wall of the cover member,
- wherein the correction magnet is disposed on a second surface of the bobbin corresponding to the fourth lateral wall of the cover member,
- wherein the coil is wound around an outer peripheral surface of the bobbin, and
- wherein the first magnet is fixed to the first lateral wall of the cover member and the second magnet is fixed to the second lateral wall of the cover member by an adhesive, respectively.

22. The lens moving unit of claim 21, wherein the sensing magnet is not overlapped with the third lateral wall of the cover member in a direction perpendicular to a surface of the third lateral wall that faces the bobbin.

23. The lens moving unit of claim 21, wherein the sensing magnet is overlapped with the first lateral wall of the cover member in a direction perpendicular to a surface of the first lateral wall that faces the bobbin.

24. The lens moving unit of claim 1, wherein the first and second lateral walls are perpendicular to the third and fourth lateral walls.

25. The lens moving unit of claim 13, wherein the housing comprises a first part disposed between the upper plate of the cover member and the driving magnets and a plurality of corner parts extending from the first part,
- wherein the plurality of corner parts comprises a first corner part disposed between the first lateral wall and the third lateral wall, a second corner part disposed between the third lateral wall and the second lateral wall, a third corner part disposed between the second lateral wall and the fourth lateral wall, and a fourth corner part disposed between the first lateral wall and the fourth lateral wall,
- wherein the first magnet is disposed between the first corner part and the fourth corner part,
- wherein the second magnet is disposed between the second corner part and the third corner part, and
- wherein the sensor is disposed between the first corner part and the second corner part.

* * * * *